March 26, 1963   J. F. ALVIS ET AL   3,082,611
PROTECTIVE MEANS

Filed July 8, 1960   2 Sheets-Sheet 1

JAMES F. ALVIS
JOSEPH V. YOUNG, JR.
INVENTORS

BY J. C. Goldwire

AGENT

March 26, 1963 J. F. ALVIS ET AL 3,082,611
PROTECTIVE MEANS

Filed July 8, 1960 2 Sheets-Sheet 2

JAMES F. ALVIS
JOSEPH V. YOUNG, JR.
INVENTORS

BY H.C. Goldwire

AGENT

United States Patent Office 3,082,611
Patented Mar. 26, 1963

3,082,611
PROTECTIVE MEANS
James F. Alvis, Dallas, and Joseph V. Young, Jr., Lewisville, Tex., assignors, by mesne assignments, to Ling-Temco-Vought, Inc., Dallas, Tex., a corporation of Delaware
Filed July 8, 1960, Ser. No. 41,587
19 Claims. (Cl. 62—217)

This invention relates to means for affording protection from thermal and radiant energies and more particularly to a system for absorbing and dissipating such energies.

In brief outline, a preferred embodiment of the invention provides for an improved and more efficient utilization of the vaporization of a liquid, preferably water or a liquid of similarly high heat of vaporization, for the protection of an object in an environment characterized by a high energy flux, for example, a large flow of heat or heat-producing emanations. Means are provided for supporting and immobilizing the liquid, without recourse to tanks, tubes, or the like, in a predetermined distribution relative to the protected object. The liquid is combined with a colloid and the resulting coagulated mixture fills the interstices between and is structurally reinforced by attenuated members such as, for example, the interconnected members making up a synthetic sponge. The composite body thus formed has an adequate degree of structural integrity and is mounted in protective relation to the object to be cooled or kept from being heated. Where required, vent means allow the escape of products generated by vaporization of the liquid, and an element operating as a pressure relief valve controls the fluid pressure at the coagulated, colloidal mixture and thereby controls the temperature at which the liquid vaporizes.

An inorganic material mixed with the liquid adds to the secondary protection from heat provided by the system.

While the beginnings of the use of the vaporization of water for temperature control probably are lost in antiquity, this method of directly cooling or preventing heating has largely been displaced in years past by other refrigerant devices, and in other cases the need for cooling has been obviated by improved insulations and by the development of materials and components highly resistant to extreme temperatures and consequently, within certain limits, not requiring thermal protection.

The most highly heat-resistant of materials currently available have their limitations, however, and as the environments in which they are placed become more and more extremely high in temperature, their heat-resistance eventually is exceeded and resort must be made to a means for limiting their temperatures toward the end of preserving their structural integrity. In the case of human beings, animal and plant lives, certain instruments, operating mechanisms, etc., these are inherently incapable of great heat resistance, and yet it has been desired that they operate, at times, in environments of extreme heat. Refrigerating and insulating methods and devices have been required, and those available up to the present have left much to be desired.

The heating from which a given structure may require protection may occur by virtue of the emanations of a radiant heat source (such as a burning building, etc.) or by contact with a relatively "static" but very "hot" object or medium (such as a red-hot piece of metal or the air in an oven). Still another class of heating, so-called aerodynamic heating, occurs where a fluid flows at a great rate relative to and impinges upon the object heated. Although the present invention is of greatly improved utility in coping with all these forms of heating, high temperatures resulting from aerodynamic heating will be chiefly considered herein in connection with the preferred embodiment shown and described. An approach from the standpoint of aerodynamic heating is believed desirable because this is usually the most serious heating experienced prior to landing on the earth by a vehicle initially travelling at a ballistic, orbital, or escape velocity. Vehicles travelling at such velocities have very high total energies which readily exceed several million B.t.u.'s and most of which must be dissipated prior to non-destructive earth contact. While atmospheric drag forces readily dissipate these energies, they subject the vehicle to high heat fluxes which, in a vehicle capable of maneuvering, may be present over a considerable period of time (for example, up to 90 minutes). The tremendous heating imposed is a serious limiting factor on performance of the vehicle and on survival of its passengers and/or equipment, and the present invention is of important significance in the astronautic and related arts because it makes possible the efficient, inexpensive, and reliable dissipation of high total energies at a rate and for a period of time distinctly beyond what has heretofore been practicable.

In the search for means for temperature control in vehicles subjected to very high heat fluxes, it has been proposed that a return be made to the vaporization of water as a way of cooling and of preventing temperature rise. For this purpose, water and similar liquids are very attractive because of their high heat of vaporization. In comparison with other materials or means for protecting from heat, water is cheap and, pound for pound, is in theory capable of more protection. Certain practical difficulties, however, have prevented the use of water with anything approaching its theoretically possible efficiency.

An important problem arises from the necessity that the water be contained in something which holds it distributed relative to a surface whose temperature is to be controlled. Probably the most nearly successful previous attempt toward this end has employed a plurality of tubes spaced over the protected surface and each filled with a wick which, before launch of the vehicle, is saturated with water. Although water wick systems probably are the most desirable to have appeared prior to the present invention, they nonetheless suffer serious disadvantages. The extensive array of tubing is dead weight which does not actively contribute to temperature control and whose momentum adds to the total energy which must be dissipated. Gravitational forces and accelerations shift the distribution of the water in the wicks and even the wicks themselves within the tubes and thus make water distribution control (hence uniform temperature control) uncertain. Valving employed in the tubes to improve water distribution control adds complexity, weight, and expense and reduces reliability. The amount of water which can be carried is limited to approximately that which can be held in the wicks by capillary attraction.

Since the wick tubes are often inaccessible in the assembled vehicle, a weighty and complex plumbing system ordinarily is installed to permit filling the wicks with water. There is little or no control possible, during the filling operation, of the exact amount of water introduced into each wick, and even the initial water distribution thus tends to be uncertain. The spaces between tubes are without full protection, but added complexity, weight, expense, etc. attend an effort to improve uniformity of protection by narrowing the tube spacing. Each tube, of course, must be vented, and steam rushing through the wick blows through the vent large amounts of unvaporized water which thus are wasted without having fulfilled their cooling function. The amount of water which can be carried by a water wick system of given weight is regrettably low and is understood not ordinarily to exceed 85% by weight of the water-filled wicks and the necessary tubes, plumbing, etc.

It is, accordingly, a major object of the present invention to provide a means having improved efficiency over previous means utilizing the vaporization of a liquid of high heat of vaporization for control of the temperature of a body in a hot environment.

Another object is to provide a heat-protective system in which a cooling liquid is stored and held immobile under gravitational forces, accelerations, extremes of temperature, impact, and humidity without resort to reservoirs, tubes, or the like.

A further object is to provide a thermal energy absorbing and dissipating system, a greater percentage of whose weight is attributable to available cooling liquid than in previous systems.

Yet another object is to provide a system which, for each pound of its weight and unit of its volume, absorbs and dissipates more thermal energy than previous systems utilizing vaporization of a liquid for temperature control.

A still further object is to provide a system which, while of highly superior efficiency and reliability, is of low cost and is easily fabricated of readily available materials.

Still another object is to provide a temperature controlling device employing components which are flexible and easily conformable to curved and irregular surfaces.

An additional object is to provide a thermal energy absorbing and dissipating system which retains its structural integrity until after essentially all its liquid is vaporized and which, after vaporization of the liquid, provides further heat protection.

Another object is to provide a thermal energy absorbing and dissipating system employing a liquid and wherein means employed for retaining the liquid are expended during and after vaporization of the liquid and leave little or no residual weight after use of the system.

A further object is to provide a thermal energy absorbing and dissipating system in which the distribution of a liquid is readily and exactly controlled and the weight of the liquid sustained without resort to tanks, tubes and the like and which system is of utility in the suppression and prevention of fires.

Other objects and advantages will be apparent from the specification and claims and from the accompanying drawing illustrative of the invention.

Figure 6:
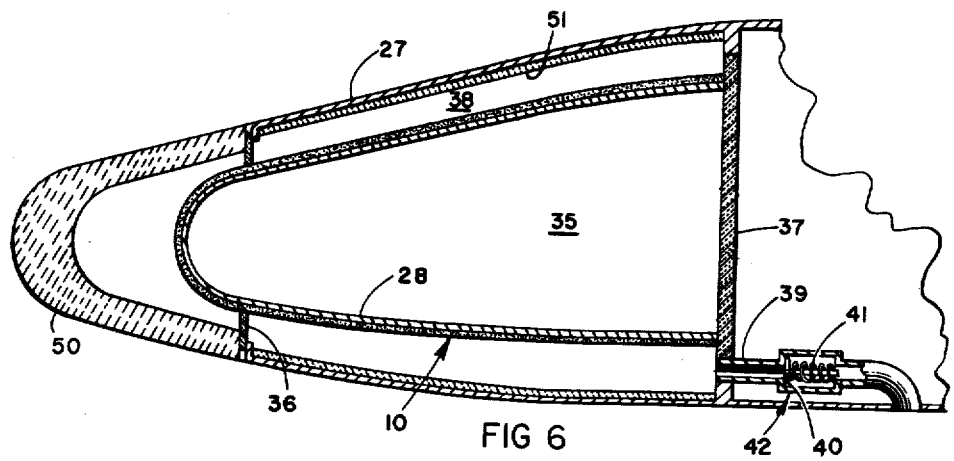
Figure 5:
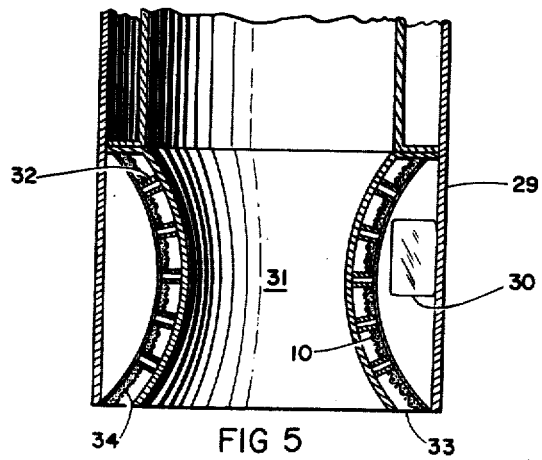

FIGURE 5 is a longitudinal sectional view of the invention applied between the inner surface of an airframe skin and a rocket engine housed within the skin for protection of the skin and a component housed thereby from the heat of the engine and for the prevention and extinction of fires; and FIGURE 6 is a view in longitudinal section of the heat protective system applied to a pressure shell housed in the interior of a vehicle.

Figure 1:
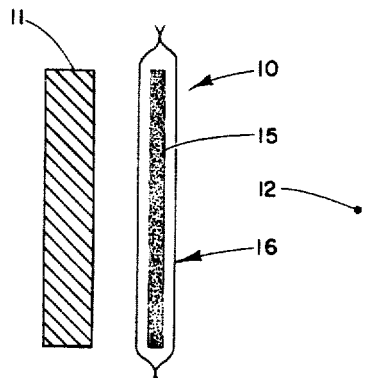
FIGURE 1 is a diagrammatic view in cross-section of the thermal energy absorbing and dissipating system in association with a body protected thereby.

With reference to FIGURE 1, the energy absorbing and dissipating system 10 comprises a composite structure 15 (fully described in later paragraphs) which preferably is mounted on or near and in covering relation to a body 11 with which it is associated and which forms a means for protection of the latter from the emanations of an energy source, for example from a source 12 of radiant heat. In most applications, it is necessary to enclose the structure 15 in an evaporation barrier 16, which in the specific example is made of sheets of vapor-proof material sealed together at their edges to enclose the body 15.

Figure 2:
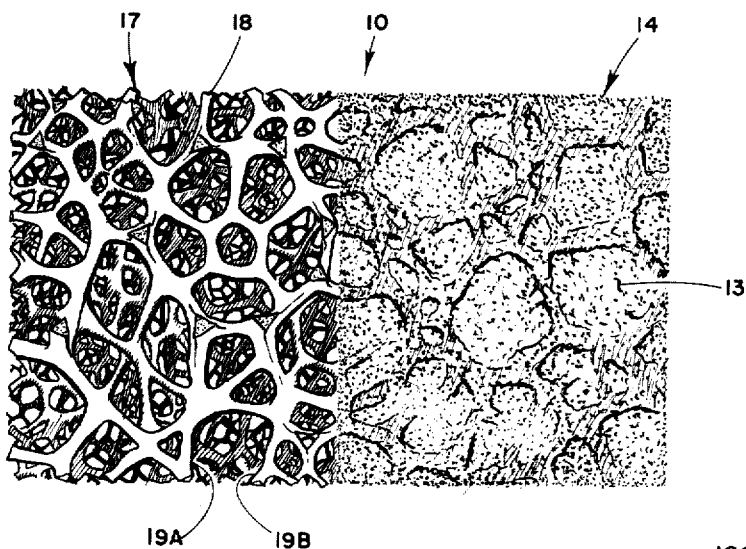
FIGURE 2 is a more detailed view of a portion of one form of the system showing the elongated members and coagulated colloidal mixture.

Referring now to FIGURE 2, the composite structure includes a colloid combined with a liquid to make a colloidal, coagulated mixture 13 which forms a coherent body 14, the term "coagulated" being employed in its sense including the terms "viscous," "jelly-like," and "solid." The liquid employed preferably is water, which gives superior results because of its very high heat of vaporization. Water is further desirable because of its ready availability, low cost, and the relative ease with which it may be combined with suitable colloids. The invention is not restricted to the use of water, however, and includes the use of other liquids having a heat of vaporization of the same order, i.e., at least 50% of that of water.

The colloid preferably employed is a natural, gel-forming material such as agar-agar; a natural or synthetic gum such as the sodium alginates or the polyacrylate salts; or a thickener, such as sodium carboxy methyl cellulose, which will increase the viscosity of a liquid with which it is combined. In most cases, a maximum water content will be desired; therefore, the amount of the colloid utilized in the mixture 13 preferably is as small as can be employed with adequate safety, in service, from loss of the liquid by dripping and from accelerations, impact, etc., the mixture being reinforced and mounted as will be described. In a preferred embodiment, the reinforcement 17 is a polyurethane foamed material whose characteristics are identified in a later paragraph, and the mixture 13 is agar-agar combined with water in the proportions, by weight, of 2½ parts of agar-agar to 100 parts of water. Good results have been obtained with even smaller amounts of the colloid. Uniformity of consistency of the cooled, coagulated mixture 13 and the obtaining of a maximum and evenly distributed water content are favored by thoroughly dispersing the agar-agar particles in cold water and then heating the water until the particles are dissolved. The addition of 0.1 of a part (by weight) of copper sulfate before the mixture coagulates will prevent bacterial and fungus growths, and other known bactericides and fungicides will serve the same purpose. Where water-induced corrosion is a possible problem following the normal or accidental release of water by the system (for example, because of accidental rupture of the evaporation barrier), it is desirable to add a corrosion preventing or inhibiting agent. This purpose is adequately served by the addition, before coagulation of the mixture, of a small amount (for example, 0.1 of a part by weight) of either the nitrite or chromate of sodium.

Of much importance to the system are the attenuated members 18 which reinforce the coherent body 14 formed by the coagulated, colloidal mixture 13 and cooperate with the latter in constituting a unitary structure the extreme desirability of whose properties will become apparent. Though a foamed material contains the attenuated members 18 shown in FIGURE 2, the attenuated members can be utilized in still other forms. In one example, they are fibers, filaments, or the like which are individually dispersed throughout the colloidal mixture or which are interconnected or interlaced to form many small, individual groups thoroughly intermixed into the colloidal mixture before coagulation of the same. In such a case, enough of the fibers should be employed to provide, upon their even distribution throughout the colloidal mixture, a uniform reinforcement in all directions.

Figure 3:
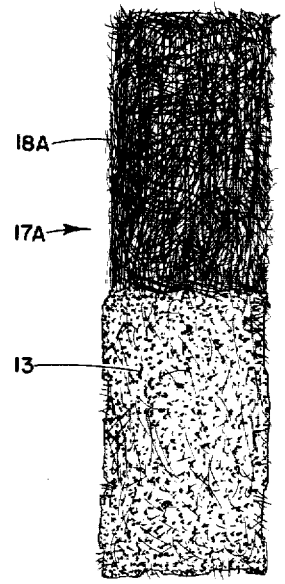
FIGURE 3 shows interlaced fibers suitable for use as the elongated members.

FIGURE 3 shows another form of the attenuated members wherein fibers or filaments 18A (preferably of low density) are interlaced or interconnected to form a loosely matted or woven reinforcing structure 17A and which is filled by the coagulated, colloidal mixture 13. Integration of the attenuated members into a single structure such as a mat 17A (FIGURE 3) or sponge 17 (FIGURE 2) is desirable in that the integrated structure has a considerable strength of its own which it contributes to the system and which is retained until after expenditure of the liquid in the system. In addition, a predetermined distribution of the attenuated members within the colloidal mixture 13 is more easily effected than where they are loose or in small groups.

With reference to FIGURE 2, wherein one form of the reinforcing structure 17 is depicted in detail, the attenuated members 18 (in the example shown in FIGURE 2 and also in all other forms in which they are provided) have mutually spaced portions such as 19A, 19B which define interstices between them. FIGURE 2 shows only part of the reinforcing structure 17 filled with the colloidal mixture 13 in order to show the attenuated members 18 with greater clarity; in practice, all the interstices are filled and the attenuated members 18 surrounded by the colloidal mixture 13.

The widths of the interstices are not escpecially critical; in general and in all modifications of the invention, the attenuated members must be closely enough spaced to provide sufficient reinforcement of the coherent body formed by the coagulated, colloidal mixture to prevent its disintegration by cracking and breaking away during handling and under operational conditions of vibration, etc. There is no limit on the minimum size of the interstices as long as fiber diameter, in relation to the width of the interstices, is kept small. Note, however, that this last-named relationship is important and must be observed to ensure that a very high percentage of the total volume of the system will be occupied by the immobilized water or other liquid. In contradistinction to a wick, whose fibers retain a liquid primarily by absorption and capillary attraction, the prime purpose of the attenuated members employed in the present invention is to reinforce the coagulated, colloidal mixture. In general, the interstices should be at least twice as wide as the threads, fibers, or other attenuated members between which the interstices lie; actually, much more widely spaced members are generally to be preferred, as will be evident from the weight per volume of a preferred material noted below.

A considerable variety of materials may be employed for providing the attenuated members. Depending upon the specific application, both organic and inorganic fibers or filaments offer advantages. Among suitable inorganic materials are glass fibers of random, interlaced relation such as employed in air filters, insulation blankets, etc. Asbestos and rock wool fibers also are of utility, as are still other inorganic materials. Attenuated members of organic nature include animal and vegetable fibers as well as nylon, rayon, etc., and the polyester fibers are especially desirable because of their low density and high strength. All the above materials may be employed where loose individual fibers or groups of fibers are stirred into or impregnated with the colloidal mixture before coagulation of the same, and for this usage there should be mentioned relatively small bits and pieces broken from larger pieces of natural sponge or from a foamed, artificial, organic or inorganic sponge material.

In common with others of the inorganic materials named above, an inorganic foamed material has insulating qualities which offer protection from high temperatures that may occur after expenditure of all the liquid in the system and, in addition, is capable of providing relatively good rigidity and strength under loads in compression, tension, and shear. To ensure substantially complete filling of all the interstices and continuity of the coherent body formed by the colloidal mixture, the cells of all foamed materials, organic or inorganic, must be open, i.e., freely intercommunicating. Inorganic sponges useful in the invention include (but are not limited to) blown glass and ceramic foams and foams of a preferably light metal such as aluminum.

The flexible, organic, foamed materials offer the advantage of ready conformability to various desired shapes and are not subject to structural failure under vibration or from impact. Among suitable materials in this class are foamed cellulose acetate, and still other foamed organic materials of suitable properties are available. To cite a specific material by way of preferred example, the thermal energy absorbing and dissipating system currently employed for protecting an airframe structure of a rocket-propelled vehicle from rocket nozzle heat includes a polyurethane foam which is flexible, has open cells, and is of a maximum density of six pounds per cubic foot.

Where the attenuated members are stirred into the colloidal mixture, the resulting, reinforced mixture is caused to level out in a pan (or equivalent) to a depth which will result in a coagulated body of desired thickness, or it may be coagulated in a mold to produce any desired shape. Where the attenuated members are interrelated so as themselves to form an integrated structure, this structure is thoroughly impregnated and filled with the mixture which subsequently is cooled to promote coagulation. Where a flexible foamed structure 17 (FIGURE 2) is employed, it is desirable to place the structure in a pan and cover it with an excess of the hot mixture 13. The foamed material 17 then is compressed, beneath the surface of the mixture, by rollers or other means until substantially all air is expelled. When the mixture 13 has cooled and coagulated, excess mixture 13 preferably is scraped or cut from the faces of the foamed material 17. Especially where rigid foamed materials are employed as the reinforcing structure, vacuum impregnation is a convenient and efficacious mode of filling the interstices with the colloidal mixture. As noted above, air is expelled by compressing the foamed material 17 or eliminated by vacuum impregnation; therefore, the mixture 13 is homogenous in that it is substantially free of air bubbles.

In FIGURE 2, the interstices interlying the attenuated members 18 are the intercommunicating cells of the foamed material 17, and these cells are filled as described by the coagulated, colloidal mixture 13. The coherent body 14 formed by the colloidal mixture 13 surrounds and is reinforced by the attenuated members 18 and thus cooperatively forms, with the latter, an integrated structure. If the foamed material 17 were submerged in and filled with water and then lifted into the air, water would pour and drip from its interstices and it would soon come to contain, like a wick, only the amount of water which its attenuated members were able to hold by capillary attraction and (depending upon the material) by absorption. Even a light pressure would expel some of the remaining water, as would a moderate acceleration. The system herein described contains not only the quantity of liquid which can be retained by capillary attraction and absorption but, by virtue of the colloid, contains in addition to this quantity of liquid a second quantity which is advantageously large in comparison with the first. The liquid, immobilized by joint action of the colloid and attenuated members, does not run or drip away, and the system withstands considerable pressures and accelerations without loss or alteration of the distribution of the liquid. To cite an example, specimens of the system 10 have been found readily to endure, without loss or change in the distribution of the coagulated, colloidal mixture 13, accelerations imposing forces 16 times that of gravity. These specimens included approximately 3% colloid and 97% water by weight, and still higher accelerations are easily borne when the amount of colloid employed in the mixture is even slightly increased.

The reinforced, coagulated, colloidal mixture 13 is subject to drying, and in many environments it is desirable to enclose it with a vapor-impermeable means to prevent the vaporization and loss of the liquid. The term "vapor-impermeable," as used herein, indicates a degree of impermeability sufficient, in a particular set of circumstances, to prevent an excessive loss of vapor in a given time; the term is not intended to indicate an absolute impermeability. When the system 10 is installed, during service or storage, in a container or compartment which is, to the above extent, vapor-tight, the compartment walls serve as the vapor-impermeable means and additional liquid is introduced as required into the compartment to bring about an equilibrium wherein a desired percentage of its liquid is retained in the system. Where additional or other means for minimizing vaporization are needed, this is readily supplied, as in FIGURE 1, by an evaporation barrier 16. The sheet material of the evaporation barrier 16 preferably is of a light gage since it need not support the weight of the coagulated, colloidal mixture of the composite structure 15 or bear any mechanical or fluid pressures, other than vapor pressures, originating from the same. On the other hand, the evaporation barrier 16 should be strong enough to withstand necessary handling, etc. to which the system 10 will be exposed. Besides metallic foils, polyvinyl chloride, polytetrafluoroethylene, and polyethylene films are exemplary of suitable sheet materials for the evaporation barrier 16. Where the reinforced, colloidal mixture 15 is mounted on or adjacent an unbroken, vapor-impermeable surface, for example, a surface of the protected body or of a backing plate, this surface may serve together with a sheet of foil or plastic to enclose the reinforced mixture and prevent evaporation from the same.

In a modification, the evaporation barrier 16 comprises a coating 20 (FIGURES 4A, 4B) of a liquid which, when sprayed or otherwise applied in single or multiple coats, dries or sets to form a continuous, vapor-impervious film enclosing the composite body 15 formed by the reinforced, coagulated mixture. Though desirable, adherence of the film 20 to the composite body 15 is not in all cases essential. Suitable coating liquids 20 (to be applied alone or in successive coats of one liquid following another) include vinyl-vinylidine chloride copolymer lacquers; Buna-n rubber dispersed in a solvent to form a lacquer; nitrocellulose lacquers; oleoresinous coating systems; and water dispersions of polyvinyl acetates, polyacrylates, or styrene-butadiene lattices.

Where it is desired to provide added support for the evaporation barrier coating 20, a structure such as a mesh screen 21 (FIGURES 4A, 4B) is positioned with one of its faces adjacent a face of the foamed material or other reinforcing structure of the composite body 15 and attached in covering relation thereto by any convenient means, for example by quilting 22 which passes through both the first structure provided by the reinforcement and the second structure identified as the evaporation barrier supporting means 21. Another mode of attachment of the screen 21 to the composite body 15 is by fasteners such as the rivets 23 of FIGURE 4B. In lieu of the mesh screen 21, there may be employed a perforated plate or other structure with a plurality of openings between its first and second (i.e., inner and outer) faces through which vapors can escape. The supporting means 21 is attached either after or before the foamed material (or equivalent) is filled with the colloidal mixture; in either case, it is necessary that the second face of the supporting means 21 be substantially bare of the coagulated mixture of the composite body 15 where adherence of the evaporation barrier 20 directly to the suport 21 is desired. The supporting means 21 is made of inorganic materials where strength and/or an insulating capability at high temperatures are desired. Where energy absorption and dissipation by the supporting means 21 by change of chemico-physical state at high temperatures is desired, an organic material is generally preferable.

Figure 4A:
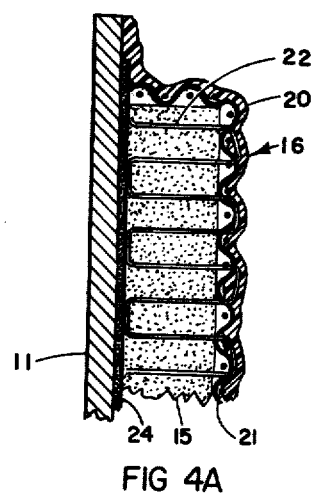
FIGURES 4A and 4B are diagrammatic, sectional views of the system showing the vapor barrier supporting means applied thereto.

As shown in FIGURE 4A, a useful means for mounting the thermal energy absorbing and dissipating system in covering relation to a protected body is an adhesive 24. According to a preferred way of utilizing the adhesive 24, outer portions of the reinforcing structure employed in the composite body 15 at one face of the same are left bare of the colloidal mixture and, after coagulation of the latter, the exposed, attenuated members are coated with the adhesive 24 and the composite body 15 is pressed against the adjoining surface of the protected body 11 until the adhesive has set. A suitable adhesive for this purpose, where water is the liquid in the system, is a Buna-n dispersion in methyl ethyl ketone. Where another liquid is utilized in the colloidal mixture, the adhesive selected must, of course, be one which will set and maintain an adequate bond in the presence of the liquid or its vapors. According to still another way of adhesively attaching the system, the foamed sponge or other reinforcing structure employed in the composite body 15 may be treated with adhesive 24 which is set or cured to bond the structure to the protected body 11 or other structure before filling the interstices of the reinforcing structure with the colloidal mixture.

Figure 4B:
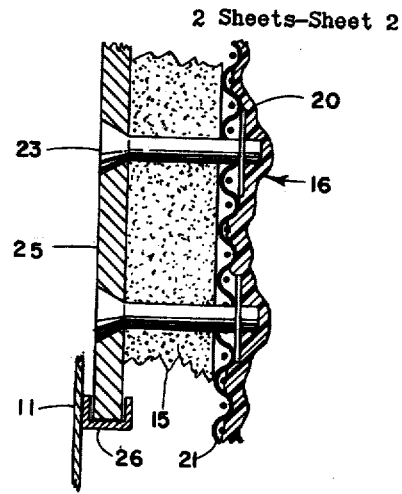

The thermal energy absorbing and dissipating system may be mounted, as shown in FIGURE 4A, directly on the protected body 11, or it may be mounted on a solid or perforated backing plate 25 (FIGURE 4B) which, in turn, is mounted by any convenient and suitable means in covering relation on or near the protected body. As an example, rivets 23 are employed in FIGURE 4B, and these pass through the composite body 15 and plate 25 and (where it is employed) preferably pass through the supporting structure 21 for the evaporation barrier 16. The latter preferably lies over and is not interrupted by the fasteners 23 but, if pierced by the fasteners, should be well sealed around the same. In FIGURE 4B, 11 is the protected body or a structure near and preferably in fixed relation with the same. On the structure 11 is mounted a channel member 26 which slideably engages an edge of the backing plate 25, and an equivalent of the channel member 26 similarly engages the opposite edge (not shown) of the plate. By virtue of this construction, the composite body 15 is readily and quickly installed on the structure 11 and is easily replaced. This feature is especially advantageous where the system must be introduced into a narrow, confined space as between the outer wall 27 and the pressure shell 28 of the vehicle shown in FIGURE 6.

FIGURE 5 shows the system employed in covering relation to an airframe wall 29 and an airframe-housed, heat-susceptible component 30 between the latter and a radiant heat source which is a rocket nozzle 31 housed by the wall 29. The face 34 of the system 10 which is exposed to the heat of the nozzle 31 is spaced from the latter by mounting spacers 32 to allow for the escape of steam, and an opening 33 vents the steam to the atmosphere.

FIGURE 6 represents a portion of a vehicle whose outer wall 27 has an outer surface which is subject to exposure to extreme aerodynamic heating. The outer wall 27 incloses or forms a compartment within whose volume is housed a body such as a pressure shell 28 whose interior is an inner compartment 35 in which may be housed passengers, heat-susceptible instruments, etc. Means such as spacers 36, a transverse bulkhead 37, etc. mount the body 28 in the volume housed by the wall 27 and in spaced relation to the wall inner surface; and the wall 27 and shell 28, between them, define and bound a cavity or outer compartment 38. A passage, such as a conduit 39, provides communication between the cavity 38 and the ambient, gaseous medium exterior to the outer wall 27.

An element such as a poppet 40 is mounted in or at an end of the passage 39 and is biased, as by a spring 41, toward a position in which it closes the passage 39 and thereby prevents the escape of fluid therethrough. The arrangement of the element 40, however, is such that the fluid pressure in the outer compartment or cavity 38 urges the element toward an open position in which it allows the escape of fluid through the passage 39. The vapor pressure within the cavity 38 at which the element 40 is moved to its open position is predetermined by the strength of the spring 41. The element 40 thus functions as and constitutes (in cooperation with its seat and the spring 41) a relief valve 42 which allows the outflow, at a predetermined pressure in the cavity, of fluid through the passage 39.

To protect the shell 28 and reduce heating of the inner compartment 35 by heat flux through the outer wall 27, there is combined with the above-described construction the thermal energy absorbing and dissipating system 10 already described. The system 10 is mounted in covering relation to the shell or inner wall 28 and may be situated directly on the latter or spaced from it. In any event, the surface of the system adacent the heat source, in this case the outer wall 27, must be spaced from the same, and the system 10 is situated in the outer compartment or space 38 between the pressure shell 28 and outer wall 27.

During storage prior to being placed in operational position relative to a body to be protected, or while operationally positioned but prior to having experienced high temperatures, the evaporation barrier 16 prevents excessive loss of liquid from the energy absorbing and dissipating system 10. The temperature at which the system 10 goes into full operation for limiting the maximum temperature of the protected object or objects is readily controlled by means, such as the pressure relief valve 42 of FIGURE 6, which ensure the retention of vapors released, upon a considerable rise in temperature, from the system. By preventing release of the vapors, below a predetermined pressure, from the space 38 in which the system 10 is enclosed, the pressure control means 42 regulates the temperature at which the liquid in the system 10 boils and thus the maximum temperature of the article 28 protected.

When subjected to a sufficient internal pressure from vapor released from the system 10, the evaporation barrier 16 (FIGURES 1, 4A, and 4B) ruptures and releases the vapors into the space, for example the cavity 38 (FIGURE 6), adjoining the system. Even when the system 10 is subjected to a very high heat flux, boiling tends to occur at and very near its heated surface, and the balance of the liquid remains below its boiling point. Thus, until all the liquid of the system 10 is boiled away, the temperature of the protected item 28 cannot rise above the boiling point of the liquid.

Once the liquid is expended, however, the system 10 continues to provide heat protection. Especially where the attenuated members 18 or 18A (FIGURE 2 or 3) and/or the evaporation barrier supporting means 21 (FIGURES 4A, 4B) are made of inorganic materials, these serve as insulating means which retard the passage of heat therethrough from the heat source into the protected body. On the other hand, the chemical and physical changes which occur in the attenuated members 18, 18A (FIGURES 2, 3), colloid of the coagulated mixture 13, and the evaporation barrier supporting means 21 (FIGURES 4A, 4B), when they are subjected to high temperatures following boiling away of all the liquid, themselves absorb thermal energy and for a further and significant time limit the temperature to which the protected body can rise.

An important advantage is seen in that the present invention not only absorbs energy but also dissipates it. Systems have been proposed in which environmental heat is absorbed by a non-disposable heat sink and/or in which transmission of heat to a protected body is slowed by insulation. It is an important advantage of the present invention that it is readily combinable with both such expedients to provide a highly improved protection from heat. Thus, for example, the outer wall 27 (FIGURE 6) of a vehicle is shown to be made thick enough, especially at its nose portion 50, to retain so large a proportion of the heat generated during an entry into an atmosphere that the amount radiated from its inner surface to the pressure shell 28 would not, during the time-span of the entry, raise the shell to an excessive temperature. The thickened material of the nose portion 50 thus serves as a thermal barrier. In addition to or in place of a thickened wall as at nose portion 50, insulation 51 is employed in the space 38 between the outer wall 27 and the pressure shell 28 to slow the transmission of thermal energy from one to the other, the insulation then forming the thermal barrier. In either case, large amounts of the thermal energy generated at the wall 27 by air-drag during the entry are retained in the vehicle and would eventually strike through the thermal barrier 50 or 51 to the pressure shell 28. Though in one sense the heat-protective system 10 of the present invention is itself a heat sink and does not preclude the use of (but is readily combinable with) other such heat sink and insulating means, it will be noted that the system 10 not only absorbs but disposes of thermal energy which passes the thermal barrier (nose portion 50 or wall 27 and insulation 51) and which otherwise would heat the pressure shell 28. The thermal energies absorbed by the system 10 are resident in the energies of the vapors into which the liquid is converted and in the gases and vapors into which the attenuated members 18, 18A and evaporation barrier support 21 are converted by high temperatures. Since these end-products of the system 10 are released overboard through the vent provisions (such as the passage 39 of FIGURE 6), the thermal energies which they carry are not retained in the vehicle but are jettisoned and thereby eliminated. As explained in connection with FIGURES 4A and 4B, the supporting means 21 may be made of insulating materials; or the insulating materials may be applied, as shown in FIGURE 6, to the inner surface of the wall 27. In all cases, the evaporation barrier (thickened wall portion 50 or insulation 51) is located between the heat source and the heat protective system comprising the colloidal, coagulated mixture.

Because it effectively immobilizes and holds water or a similar liquid without resort to tanks, tubes, etc., the present heat-protective system 10 is relatively very light in weight in comparison with previous systems, for a much greater percentage of its weight is attributable to available cooling liquid. Thus, for each pound of its weight and unit of its volume, the means described herein absorb and dissipate significantly more thermal energy than previous systems utilizing vaporization of a liquid for temperature control.

Because of its relatively high viscosity and because of the reinforcement provided by the attenuated members 18, 18A, the coagulated, collidal mixture 13 does not shift under accelerations which would be accompanied by considerable redistributions of the liquid in, for example, a well-saturated wick containing, per pound and per unit volume, much less liquid. The system 10 containing the reinforced, coagulated, colloidal mixture 13 is readily made and applied in sheet-like form and thus provides an even, continuous protection over all of a protected area without the occurrence of local "hot spots." As the percentage of liquid present in the mixture and the thickness of the sheet are readily controlled during manufacture, the amount of liquid protecting any given area of a surface is easily and certainly known, and the distribution of the liquid is readily and easily controlled.

In still another modification of the invention, and with reference to FIGURE 2 by way of example, an inorganic, soluble material is mixed (i.e., dissolved, dispersed, or distributed) in the liquid of the colloidal mixture 13 at a time prior to coagulation of the same. The added inorganic material adds little to the total volume of the system 10 yet is highly efficient in providing thermal energy absorption and dissipation after vaporization of the liquid in the system. In a previously cited, specific example, agar-agar and water are combined to form the colloidal mixture 13; and lithium halides as well as boric acid have with good results been mixed with the water utilized in the colloidal mixture. The initial period of exposure of the system 10 to elevated temperatures expends the liquid in the system; following this, much heat is absorbed in the melting and other chemico-physical changes which occur, upon a sufficient further rise in temperature, in the added inorganic material. Per pound of added inorganic material employed, the energy absorption is quite large: to cite examples, approximately 3500 B.t.u.'s are expended in melting a pound of lithium fluoride and 1560 B.t.u.'s in melting a pound of lithium chloride, whereas about 970 B.t.u.'s are required in the vaporization of a pound of water. In this form of the invention, the reinforcing structure 17 is preferably a matted or foamed structure made of a material capable of enduring heat to such extent that it will not disintegrate excessively before melting of the added inorganic material. For this purpose, reinforcing structures made of quartz, alumina, or porous carbon are satisfactory. It is desirable that the melted inorganic material originally mixed in the mixture 13 be eliminated from the vicinity of the protected object, and this is readily accomplished, especially in the case where (with reference to FIGURE 4A) the protected body 11 is taken as an outer wall on whose exterior surface the energy absorbing and dissipating system 10 is mounted. Upon termination of the protection afforded by the liquid in the system 10, the temperature at the outer face of the system rises to a point where the added inorganic material melts and is blown away by the airstream, thus carrying with it energy originally present as momentum of the protected body 11 and associated structure.

It will be understood that the usefulness of the invention in protecting from heat is by no means limited to cases where high temperatures are induced by aerodynamic heating. Among its many other uses, the energy absorbing and dissipating system is of excellent utility in the prevention and extinction of fires. In FIGURE 5, the maximum temperature of the item 30 is limited as described by action of the system 10 and its ignition by thermal energy radiated from the nozzle 31 is prevented. Should a burning material be introduced between the system 10 and nozzle 31, the burning is choked and extinguished by vapor, released by its heat and/or the heat of the nozzle 31, from the system 10. With reference to FIGURE 1, if the item 11 be taken to be a building, a reservoir containing a flammable liquid, etc., the system 10 protects the item 11 from the heat of the source 12 where the latter is a burning, fixed material or structure and intercepts and cools the source 12 below ignition temperature where the source 12 is a moving object or material which otherwise would impinge upon the item 11 while at a temperature sufficiently high to effect ignition of the latter.

While the utility of the invention has been described largely in terms of the absorption and dissipation of thermal energies, it will be evident that the reinforced, coagulated, colloidal mixture provides an efficient, relatively light-weight shielding structure which is efficient in the absorption of electro-magnetic emanations and the radiations of radioactive materials and which produces little or no secondary radiation. Where the system 10 is employed for shielding from radioactive substances, the materials employed should have adequate resistance to the radio-emanations. Among the colloids more resistant in this respect are cellulose derivatives such as sodium carboxy methyl cellulose. A foamed material made from cellulose is suitable for the reinforcing material which supplies the attenuating members 18, 18A, and any material whose chemical structure will allow bond resonance (such as the polystyrenes) are suitable for the evaporation barrier support 21. The evaporation barrier 16 may be made of a butadiene-styrene copolymer. Metals, of course, also may be used for all of the above items except the colloid.

While only one embodiment of the invention has been described in detail herein and shown in the accompanying drawing together with several modifications thereof, it will be evident that further modifications are possible in the arrangement and construction of the energy absorbing and dissipating system without departing from the scope of the invention.

We claim:

1. An energy absorbing and dissipating system comprising: attenuating members mutually spaced to provide interstices therebetween; and a colloidal, coagulated, homogenous mixture substantially filling the interstices and surrounding the attenuated members, the latter lying in reinforcing relation to the mixture.

2. The system claimed in claim 1, the colloidal, coagulated mixture including a colloid and a liquid whose heat of vaporization is of the order of that of water.

3. The system claimed in claim 1, the majority of the interstices being of a diameter exceeding twice the average diameter of the attenuated members.

4. An energy absorbing and dissipating system comprising: reinforcing means including attenuated members having mutually spaced portions defining interstices; a first quantity of a liquid equal to all of the liquid that can be supported by the attenuated members by absorption and capillary attraction; a second quantity of the liquid combined with the first; and a colloid combined with both said quantities of liquid and forming therewith a homogenous, colloidal, coagulated mixture surrounding the elongated members and substantially filling the interstices.

5. A thermal energy absorbing and dissipating system comprising: means including attenuated members mutually spaced to provide interstices therebetween; a colloidal, coagulated, homogenous mixture substantially filling the interstices and surrounding the attenuated members, the latter lying in reinforcing relation to the mixture and the coagulated colloidal mixture forming a coherent body incorporating the attenuated members and including a colloid and a liquid; and vapor-impermeable means enclosing the coherent body.

6. A thermal energy absorbing and dissipating system comprising: a first structure including attenuated, interconnected members mutually spaced to define interstices therebetween, said structure having a face; a second structure having a first face disposed adjacent and in covering relationship to at least a portion of said face of said first structure and further having a second, opposite face, the second structure having a plurality of openings extending between the first and second faces thereof; means attaching the second structure to the first structure at a plurality of mutually spaced locations; a colloidal mixture substantially filling the interstices between the attenuated, interconnected members, the latter being surrounded by and lying in reinforcing relationship to the mixture, the second face of the second structure being substantially bare as regards coverage by the mixture; and vapor-impermeable means enclosing the coagulated colloidal mixture and including a coating adherently attached to the second face of the second structure.

7. In combination with a body to be protected from heat, a thermal energy absorbing and dissipating system comprising: means including attenuated members mutually spaced to provide interstices therebetween; a homogeneous, colloidal, coagulated mixture filling the interstices and surrounding the attenuated members, the latter lying in reinforcing relation to the mixture; and means mounting said system in covering relation to said body.

8. In combination with a body, means for protecting the body from heat emanating from a heat source, said means comprising: means including attenuated members mutually spaced to provide interstices therebetween; a colloidal, coagulated, homogenous mixture filling the interstices and surrounding the attenuated members, the latter lying in reinforcing relation to the mixture; and means mounting said means including attenuated members between said body and the heat source.

9. In combination with a wall having an outer and an inner surface and whose outer surface is heated, means protecting a body from heat flow through the wall and comprising: means mounting the body adjacent and spaced from the wall inner surface to define a space between the body and wall; and a heat absorbing and dissipating system mounted in covering relation to the body in the space between the latter and the wall, said system comprising means including attenuated members mutually spaced to provide interstices therebetween and a homogenous, colloidal, coagulated mixture filling the interstices and surrounding the attenuated members, the latter lying in reinforcing relation to the mixture.

10. In combination with a wall enclosing a compartment and having an outer and an inner surface, at least a major portion of the outer surface being exposed to a heating environment, means for protecting a body from heat flow through the wall comprising: means mounting the body in the compartment and spaced from the wall inner surface to define a cavity therebetween; at least one passage providing communication between the cavity and the exterior of the compartment; and a heat absorbing and dissipating system mounted in the cavity in spaced relation with the wall, the system comprising means including attenuated members mutually spaced to provide interstices therebetween and a homogenous, colloidal, coagulated mixture filling the interstices and surrounding the attentuated members, the latter lying in reinforcing relation to the mixture.

11. In combination with a construction wherein an outer wall which is subject to heating by a fast-moving relative flow of a gaseous medium encloses a volume within which is located an inner wall forming an inner compartment and spaced from the outer wall to form therebetween an outer compartment, means for reducing heating of the inner compartment by heat flux through the outer wall, said means comprising: a passage providing communication between the outer compartment and the gaseous medium; an element biased toward a position in which it closes the passage and movable by fluid pressure in the outer compartment to an open position in which it permits fluid flow through the passage; a structure including interconnected, attenuated members mutually spaced to form interstices therebetween; means mounting the structure in the outer compartment in covering relation to the inner wall; and a colloidal mixture filling the interstices between the attenuated members, the latter being surrounded by and lying in reinforcing relationship to the mixture.

12. An energy absorbing and dissipating device comprising: attenuated members mutually spaced to define interstices therebetween and interconnected to form an integrated structure; a colloidal, coagulated mixture substantially filling the interstices and surrounding the attenuated members, the latter lying in reinforcing relation to the mixture; a backing plate; and fasteners attached to the plate and integrated structure for mounting the latter on the former.

13. For protection from a heat source, the arrangement comprising: an energy absorbing and dissipating system comprising attenuated members mutually spaced to provide interstices therebetween, and a colloidal, coagulated, homogenous mixture substantially filling the interstices and surrounding the attenuated members, the latter lying in reinforcing relation to the mixture; and a thermal barrier disposed between the energy absorbing and dissipating system and the heat source.

14. The arrangement claimed in claim 13, the thermal barrier comprising a thickened wall.

15. The arrangement claimed in claim 13, the thermal barrier comprising a layer of an insulating material.

16. A device for energy absorption and dissipation, said device comprising: attenuated members mutually spaced to form interstices therebetween and interconnected to form an integrated structure having at least one face; a colloidal, coagulated mixture substantially filling the interstices and surrounding the attenuated members, the latter lying in reinforcing relation to the mixture; material provided with a plurality of openings and disposed in covering relation to said at least one face of said integrated structure; and mechanical fastening means linking said material with said integrated structure.

17. A device for energy absorption and dissipation, said device comprising: attenuated members mutually spaced to form interstices therebetween and interconnected to form an integrated structure having at least one face; a colloidal, coagulated mixture substantially filling the interstices and surrounding the attenuated members, the latter lying in reinforcing relation to the mixture; a sheet of meshed material disposed in covering relation to said at least one face of said integrated structure; and quilting attaching the meshed material to the integrated structure.

18. The device claimed in claim 17, the meshed material being inorganic.

19. The device claimed in claim 17, the meshed material being organic.

References Cited in the file of this patent

UNITED STATES PATENTS

| | | |
|---|---|---|
| 1,544,196 | Teitsworth | June 30, 1925 |
| 2,140,063 | Talalay | Dec. 13, 1938 |
| 2,498,785 | Bennett | Feb. 28, 1950 |
| 2,809,173 | Dereniuk | Oct. 8, 1957 |
| 2,809,174 | Dereniuk | Oct. 8, 1957 |
| 2,863,305 | Shepherd | Dec. 9, 1958 |
| 2,879,197 | Muskat et al. | Mar. 24, 1959 |
| 2,908,455 | Hoadley | Oct. 13, 1959 |
| 2,922,291 | Fox et al. | Jan. 26, 1960 |
| 2,941,759 | Rice | June 21, 1960 |

FOREIGN PATENTS

| | | |
|---|---|---|
| 1,199,550 | France | June 22, 1959 |

OTHER REFERENCES

"Latex in Industry," by Royce J. Noble, second edition (1953), pages 58 and 59, published by Rubber Age, 250 West 57th Street, New York 19, New York.

UNITED STATES PATENT OFFICE
CERTIFICATE OF CORRECTION

Patent No. 3,082,611                      March 26, 1963

James F. Alvis et al.

It is hereby certified that error appears in the above numbered patent requiring correction and that the said Letters Patent should read as corrected below.

Column 7, line 41, for "lattices" read -- latices --; column 10, line 18, for "nat" read -- not --; column 12, line 15, for "attenuating" read -- attenuated --.

Signed and sealed this 8th day of October 1963.

(SEAL)
Attest:

ERNEST W. SWIDER
Attesting Officer

EDWIN L. REYNOLDS
Acting Commissioner of Patents